(12) United States Patent
Schulz

(10) Patent No.: US 11,268,425 B2
(45) Date of Patent: Mar. 8, 2022

(54) DETERMINATION OF AN ASH LOADING OF A PARTICULATE FILTER FOR AN INTERNAL COMBUSTION ENGINE

(71) Applicant: Bayerische Motoren Werke Aktiengesellschaft, Munich (DE)

(72) Inventor: Ralf Schulz, Puchheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/053,673

(22) PCT Filed: May 3, 2019

(86) PCT No.: PCT/DE2019/100398
§ 371 (c)(1),
(2) Date: Nov. 6, 2020

(87) PCT Pub. No.: WO2019/214771
PCT Pub. Date: Nov. 14, 2019

(65) Prior Publication Data
US 2021/0071562 A1    Mar. 11, 2021

(30) Foreign Application Priority Data
May 9, 2018    (DE) ............. 10 2018 207 227.2

(51) Int. Cl.
*F01N 9/00* (2006.01)
*F01N 11/00* (2006.01)
*F02D 41/02* (2006.01)

(52) U.S. Cl.
CPC ............ *F01N 9/002* (2013.01); *F01N 11/002* (2013.01); *F02D 41/029* (2013.01);
(Continued)

(58) Field of Classification Search
CPC .... F01N 9/002; F01N 11/002; F01N 2560/08; F01N 2900/0422; F01N 2900/1406;
(Continued)

(56) References Cited

U.S. PATENT DOCUMENTS 6,405,528 B1 * 6/2002 Christen ................ F01N 3/035
60/295
6,928,809 B2   8/2005 Inoue et al.
(Continued)

FOREIGN PATENT DOCUMENTS

DE          102 23 427 A1    12/2003
DE    10 2004 033 412 A1     2/2006
(Continued)

OTHER PUBLICATIONS

PCT/DE2019/100398, International Search Report dated Jun. 25, 2019 (Two (2) pages).
(Continued)

*Primary Examiner* — Matthew T Largi
(74) *Attorney, Agent, or Firm* — Crowell & Moring LLP

(57) ABSTRACT

A measuring device for the determination of an ash loading of a particulate filter for an internal combustion engine of a motor vehicle, where a regeneration operation of the particulate filter is carried out such that, after termination of the regeneration operation, a predefined, minimum soot loading remains on the particulate filter. The measuring device is configured to determine an actual regeneration variable which is characteristic for a loading combustion operation during the regeneration operation of the particulate filter via a pressure sensor which is attached downstream in the exhaust gas flow of the particulate filter in the exhaust gas system of the internal combustion engine. The measuring device is further configured to determine the ash loading of the particulate filter dependent on the actual regeneration
(Continued)

variable and a variable which is characteristic for the time duration of the regeneration operation.

10 Claims, 2 Drawing Sheets

(52) U.S. Cl.
CPC .. *F01N 2560/08* (2013.01); *F01N 2900/0422* (2013.01); *F01N 2900/1406* (2013.01); *F01N 2900/1611* (2013.01); *F02D 2200/0812* (2013.01)

(58) Field of Classification Search
CPC ........... F01N 2900/1611; F02D 41/029; F02D 2200/0812
See application file for complete search history.

(56) References Cited

U.S. PATENT DOCUMENTS

| | | | |
|---|---|---|---|
| 10,066,575 B2 | 9/2018 | Suchta et al. | |
| 10,774,723 B2* | 9/2020 | Stephani | F01N 11/002 |
| 2006/0005534 A1 | 1/2006 | Wirth et al. | |
| 2014/0060008 A1* | 3/2014 | Dittler | F01N 9/002 |
| | | | 60/274 |
| 2014/0116028 A1* | 5/2014 | Sappok | F02D 41/1467 |
| | | | 60/274 |
| 2014/0318883 A1* | 10/2014 | Noguchi | F01N 3/0235 |
| | | | 180/309 |
| 2015/0204224 A1* | 7/2015 | Daido | F01N 3/0222 |
| | | | 60/301 |
| 2016/0123207 A1* | 5/2016 | Aso | F01N 3/025 |
| | | | 96/408 |
| 2016/0146077 A1* | 5/2016 | Biagini | F02D 41/0245 |
| | | | 60/274 |
| 2018/0149102 A1* | 5/2018 | Kobashi | F02D 41/3005 |
| 2021/0071562 A1* | 3/2021 | Schulz | F02D 41/029 |
| 2021/0198781 A1* | 7/2021 | Cao | C23C 2/06 |

FOREIGN PATENT DOCUMENTS

| | | |
|---|---|---|
| DE | 60 2004 001 524 T2 | 7/2007 |
| DE | 10 2008 061 992 A1 | 6/2009 |
| DE | 10 2014 203 621 A1 | 8/2015 |
| DE | 10 2014 209 810 A1 | 11/2015 |
| DE | 10 2015 117 473 A1 | 11/2016 |
| DE | 10 2017 116 405 A1 | 10/2017 |
| DE | 10 2017 115 830 A1 | 1/2018 |
| EP | 2 612 003 B1 | 7/2013 |
| EP | 2612003 B1 * | 5/2016 ........... F02D 41/029 |
| WO | WO 2011/079928 A1 | 7/2011 |
| WO | WO 2017/047349 A1 | 3/2017 |

OTHER PUBLICATIONS

German Search Report issued in German application No. 10 2018 207 227.2 dated Mar. 8, 2019, with Statement of Relevancy (Seven (7) pages).

German-language German Office Action issued in German application No. 10 2018 207 227.2 dated Sep. 7, 2020 (Eight (8) pages).

* cited by examiner

DETERMINATION OF AN ASH LOADING OF A PARTICULATE FILTER FOR AN INTERNAL COMBUSTION ENGINE

BACKGROUND AND SUMMARY OF THE INVENTION

The invention relates to a measuring device and a measuring method for ascertaining an ash loading of a particulate filter for an internal combustion engine.

It is known from DE 10 2017 116 405 A1 to detect an ash loading of a particulate filter by determining, by means of a lambda step change downstream of the particulate filter, a discharging time in which the oxygen previously stored in the particulate filter is discharged. On the basis of the discharging time, the loading of the particulate filter with ash is determined.

It is an object of the invention to specify an alternative measuring device and an alternative measuring method for ascertaining an ash loading of a particulate filter for internal combustion engines.

The object is achieved by means of the features of the independent patent claims. Advantageous embodiments are described in the dependent claims. It is pointed out that additional features of a patent claim which is dependent on an independent patent claim can, without the features of the independent patent claim or only in combination with a subset of the features of the independent patent claim, form a stand-alone invention which is independent of the combination of all features of the independent patent claim, which stand-alone invention can be made the subject of an independent claim, of a divisional application or of a subsequent application. This applies in the same way to technical teachings given in the description, which can form an invention which is independent of the features of the independent patent claims.

A first aspect of the invention relates to a measuring device for ascertaining an ash loading of a particulate filter for an internal combustion engine of a motor vehicle.

Aside from the ash, the particulate filter is also laden with soot during the operation of the internal combustion engine. Here, the ash is generally composed of combustion residues of oil, and the soot forms from residues of the combustion of fuel. The loading of the particulate filter thus comprises at least the loading of the particulate filter with ash and the loading of the particulate filter with soot.

A regeneration process of the particulate filter is performed such that, after completion of the regeneration process, a predefined minimal soot loading remains in the particulate filter. The predefined minimal soot loading may in this case for example be predefined, in a manner dependent on the efficiency of the particulate filter, during the development of the particulate filter, internal combustion engine or motor vehicle. Alternatively or in addition, the predefined minimal soot loading may also be adapted, in particular in continuous fashion, during the operation of the particulate filter.

During the regeneration process, soot in the particulate filter is burned. Here, the regeneration process serves in particular for preventing full loading of the particulate filter, which can lead to increased fuel consumption. However, no ash is burned during the regeneration process, such that, over the course of the service life of the particulate filter, the ash loading of the particulate filter continuously increases.

Here, the invention is based on the realization that the efficiency of the particulate filter is dependent inter alia on the loading of the particulate filter with soot.

Here, a relatively high efficiency is attained in particular only if the particulate filter is laden with at least a minimal loading of soot. This may for example be a minimal loading of 25%, 50% or 75%. It is thus in particular not expedient to completely burn off the soot stored in the particulate filter for the purposes of determining the ash loading of the particulate filter.

The measuring device is configured to ascertain, by means of a pressure sensor fitted in the exhaust system of the internal combustion engine downstream of the particulate filter in the exhaust-gas flow, an actual regeneration variable which is characteristic of a loading burn-off operation during the regeneration process of the particulate filter. Here, both the loading of the particulate filter with ash and the loading of the particulate filter with soot contribute to the pressure measured by the pressure sensor, for example an exhaust-gas back pressure.

Alternatively, the pressure sensor may also be fitted upstream of the particulate filter in the exhaust-gas flow.

The pressure sensor may in particular also be configured to determine a differential pressure upstream and downstream of the particulate filter. For this purpose, the particulate filter may for example comprise an access upstream of the particulate filter in the exhaust-gas flow and an access downstream of the particulate filter in the exhaust-gas flow.

Alternatively in order to determine the differential pressure, the pressure sensor may also be configured to measure only the pressure upstream of the particulate filter and to determine the pressure downstream of the particulate filter by means of a model of the components which follow the particulate filter in the exhaust system.

The differential pressure that is possibly ascertained by the pressure sensor may for example be used for determining the actual regeneration variable.

Here, a distinction between the contribution by the ash loading of the particulate filter and the contribution by the soot loading of the particulate filter is possible only for the trivial case in which the soot has been completely burned off, because in this case the contribution by the soot loading is eliminated entirely.

For this purpose, the measuring device may in particular be configured to determine, by means of the pressure sensor, a loading variable which is characteristic of the loading of the particulate filter before the regeneration process, and to determine, by means of the pressure sensor, a loading variable which is characteristic of the loading of the particulate filter after the regeneration process. The loading variable may in particular be a pressure or a variable which is characteristic of a pressure, which variable is for example normalized using the values of further influential factors (for example temperature).

The actual regeneration variable may be ascertained by the measuring device in a manner dependent on the deviation between the two loading variables. The deviation between the two loading variables may for example be a difference between the two loading variables or a ratio of the two variables with respect to one another.

Here, the invention is based on the realization that the ash loading of the particulate filter duly continuously increases and also cannot be reduced by means of a regeneration of the particulate filter. However, the ash loading of the particulate filter increases so slowly that, in particular in the determination of the two loading variables, it is possible to make the simplified assumption that the ash loading before the regeneration process substantially corresponds to the ash loading after the regeneration process, and thus does not change.

The measuring device is furthermore configured to determine the ash loading of the particulate filter in a manner dependent on the regeneration variable and on a variable which is characteristic of the time duration of the regeneration process. The variable which is characteristic of the time duration of the regeneration process may in particular be a continuous time interval, which may be specified for example in milliseconds. Alternatively, it may in particular also be a discrete measure of time, for example the number of regeneration processes performed.

In one advantageous embodiment, the measuring device is configured to ascertain, by means of a burn-off model and in a manner dependent on the time duration of the regeneration process, a modeled regeneration variable which is characteristic of the load burn-off operation during the regeneration process.

Here, the burn-off model predefines in particular an expected reduction of the loading of the particulate filter as a result of the regeneration process in a manner dependent on the time duration of the regeneration process. In the case of a regeneration process which is long in relation to a short regeneration process, the burn-off model predefines for example a greater reduction of the loading of the particulate filter.

The measuring device is furthermore configured to ascertain the ash loading of the particulate filter in a manner dependent on a deviation between the actual regeneration variable and the modeled regeneration variable. The deviation between the actual regeneration variable and the modeled regeneration variable may for example be the difference between the actual regeneration variable and the modeled regeneration variable. Alternatively, it may for example also be the ratio of the actual regeneration variable with respect to the modeled regeneration variable. Alternatively, it may for example also be the ratio of the modeled regeneration variable with respect to the actual regeneration variable.

In particular, the measuring device may be configured to ascertain a relatively high ash loading of the particulate filter in the case of a relatively large deviation between the actual regeneration variable and the modeled regeneration variable. Alternatively, the measuring device may in particular be configured to ascertain a relatively low ash loading of the particulate filter in the case of a relatively small deviation between the actual regeneration variable and the modeled regeneration variable.

In a further advantageous embodiment, the burn-off model is configured to ascertain the modeled regeneration variable, which is characteristic of the loading burn-off operation during the regeneration process, in a manner dependent on an exhaust-gas volume flow and/or on an exhaust-gas temperature and/or on a loading of the particulate filter.

In a further advantageous embodiment, the measuring device is configured to determine, by means of the pressure sensor, a loading variable which is characteristic of the loading of the particulate filter before the regeneration process, and to ascertain, by means of the burn-off model and in a manner dependent on the time duration of the regeneration process, a loading variable which is characteristic of the loading of the particulate filter after the regeneration process.

Furthermore, the measuring device is configured to ascertain the modeled regeneration variable in a manner dependent on the deviation between the two loading variables. The deviation may for example be the difference between the two loading variables or the ratio of the two loading variables with respect to one another.

In a further advantageous embodiment, the measuring device is configured to ascertain, at at least two points in time, in each case one actual regeneration variable and one modeled regeneration variable, and to detect an increase in the ash loading of the particulate filter at the second point in time, which follows the first point in time, if the deviation between the actual regeneration variable and the modeled regeneration variable is greater at the second point in time than at the first point in time.

Here, the invention is based on the realization that the ash loading of the particulate filter which increases over the course of time leads to an ever greater deviation of the actual regeneration variable from the modeled regeneration variable.

In a further advantageous embodiment, the measuring device is configured to ascertain, at at least three points in time, in each case one actual regeneration variable and one modeled regeneration variable, and to detect an increase in the ash loading of the particulate filter if a deviation, aggregated over in each case at least two points in time, between the actual regeneration variable and the modeled regeneration variable is greater at a later point in time than at a point in time which is earlier than the later point in time.

In particular, the aggregation of the deviation may be the determination of an arithmetic mean value or median value. The aggregated deviation may for example be ascertained over in each case disjoint points in time. Alternatively, the aggregated deviation may be ascertained as a floating value.

Here, the invention is based on the realization that the deviation between the actual regeneration variable and the modeled regeneration variable could possibly be subject to severe isolated disturbance influences. These isolated disturbance influences could be identified and compensated by means of the aggregation in the sense of a filtering action.

In a further advantageous embodiment, the measuring device is configured to determine, by means of the pressure sensor, a loading variable which is characteristic of the loading of the particulate filter.

Furthermore, the measuring device is configured to start the regeneration process by means of an engine control unit if a first threshold value for the loading variable is attained or overshot, to end the regeneration process by means of the engine control unit if a second threshold value for the loading variable is attained or undershot, and to determine the ash loading of the particulate filter in a manner dependent on a time duration of the regeneration process.

In particular, the measuring device may be configured to adapt the first and/or second threshold value in a manner dependent on an ash loading of the particulate filter determined at an earlier point in time. For example, the first and/or second threshold value may be increased if an increasing ash loading is detected.

Here, the invention is based on the realization that the ash loading of the particulate filter increases continuously but slowly during the operation of the internal combustion engine.

In particular, the measuring device may be configured to determine a higher ash loading of the particulate filter in the case of a regeneration process which is relatively long in terms of time in relation to a regeneration process which is relatively short in terms of time.

In a further advantageous embodiment, the regeneration process is composed of at least one regeneration phase and advantageously of more than one regeneration phase. The time duration of the regeneration phase may in particular be pre-determined as being constant, and may for example be ascertained empirically. Alternatively, the time duration of the regeneration phase may in particular also be ascertained during operation by the measuring device in a manner dependent on the burn-off model.

The measuring device is configured to determine the loading variable by means of the pressure sensor after completion of the regeneration phase, and to start a further regeneration phase if the loading variable does not yet attain or undershoot the second threshold value.

The number of started regeneration phases may then in particular be used by the measuring device as a variable which is characteristic of the time duration of the regeneration process.

A second aspect of the invention relates to measuring methods for ascertaining an ash loading of a particulate filter for an internal combustion engine of a motor vehicle.

Here, a regeneration process of the particulate filter is performed such that, after completion of the regeneration process, a predefined minimal soot loading remains in the particulate filter.

One step of the measuring method is the ascertainment of an actual regeneration variable which is characteristic of a loading burn-off operation during the regeneration process of the particulate filter.

A further step of the measuring method is the determination of the ash loading of the particulate filter in a manner dependent on the regeneration variable and on a variable which is characteristic of the time duration of the regeneration process.

The above statements relating to the measuring device according to the invention according to the first aspect of the invention also apply correspondingly to the measuring method according to the invention according to the second aspect of the invention. Advantageous exemplary embodiments of the measuring method according to the invention which are not explicitly described at this juncture and in the patent claims correspond to the advantageous exemplary embodiments of the measuring device according to the invention which are described above or described in the patent claims.

The invention will be described below on the basis of an exemplary embodiment with the aid of the appended drawings.

DETAILED DESCRIPTION OF THE DRAWINGS

Figure 1:
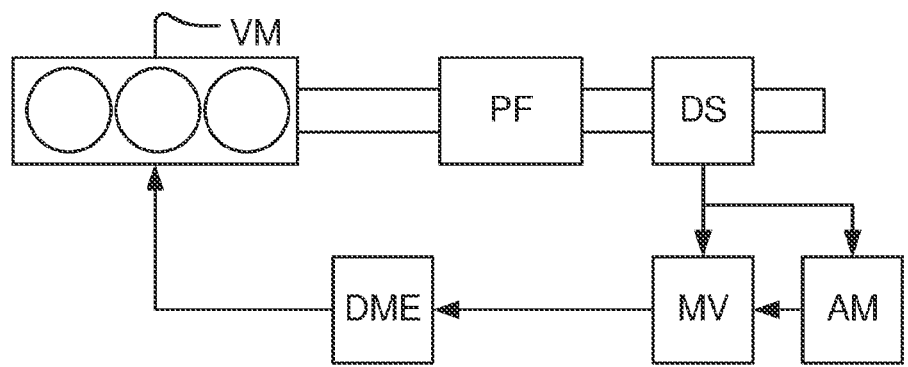
FIG. 1 shows a schematic layout of an internal combustion engine with an exhaust system connected to the internal combustion engine.

FIG. 1 shows an internal combustion engine VM, the emissions of which are conducted to a particulate filter PF. A pressure sensor DS is fitted in the exhaust system downstream of the particulate filter PF in the exhaust-gas flow.

A measuring device MV is configured to receive the values measured and possibly preprocessed by the pressure sensor DS. Furthermore, a burn-off model AM is also configured to receive the values measured and possibly preprocessed by the pressure sensor DS.

Furthermore, the measuring device MV is also configured to receive a modeled loading variable for the particulate filter from the burn-off model AM.

Furthermore, the measuring device MV is configured to start and end a regeneration process of the particulate filter PF by means of an engine control device DME through control of the internal combustion engine VM.

Figure 2:
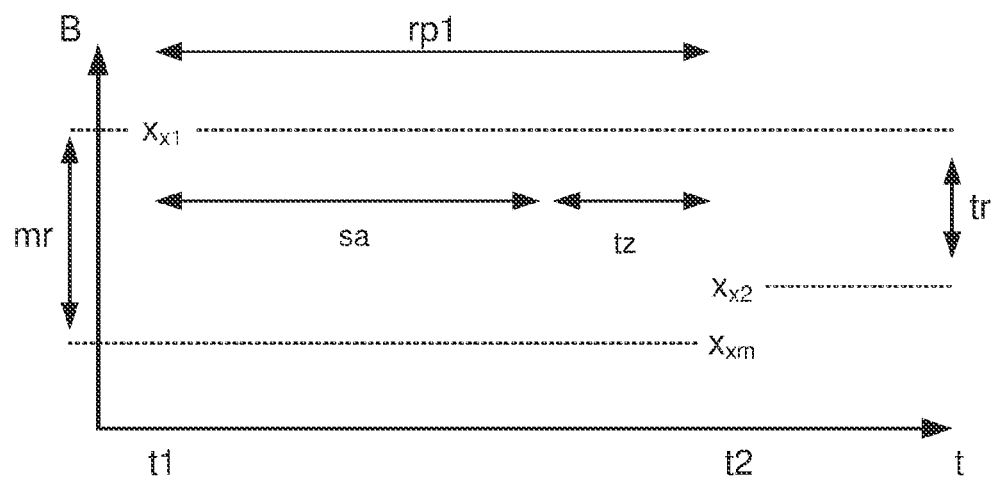
FIG. 2 shows exemplary measurement points for a loading of a particulate filter.

FIG. 2 shows exemplary measurement points for a loading of the particulate filter PF.

A regeneration process rp1 of the particulate filter PF is in this case performed such that, after completion of the regeneration process rp1, a predefined minimal soot loading remains in the particulate filter. The regeneration process rp1 may for example encompass an overrun fuel cut-off sa and a subsequent dead time.

It may be the case that a measurement of the loading B of the particulate filter PF cannot be performed during the regeneration process rp1, such that it may be the case that closed-loop control of the regeneration process rp1 is not possible.

The measuring device MV for ascertaining an ash loading of a particulate filter PF for an internal combustion engine VM of a motor vehicle is configured to ascertain, by means of a pressure sensor DS fitted in the exhaust system of the internal combustion engine MV downstream of the particulate filter PF in the exhaust-gas flow, an actual regeneration variable tr which is characteristic of a loading burn-off operation during the regeneration process of the particulate filter PF.

For the ascertainment of the actual regeneration variable tr, the measuring device MV is configured to determine, by means of the pressure sensor DS, a loading variable x1 which is characteristic of the loading of the particulate filter PF before the regeneration process, and to determine, by means of the pressure sensor DS, a loading variable x2 which is characteristic of the loading of the particulate filter PF after the regeneration process.

The actual regeneration variable tr may then be ascertained in a manner dependent on the deviation between the two loading variables x1, x2.

Furthermore, the measuring device MV is configured to ascertain, by means of a burn-off model AM and in a manner dependent on the time duration td of the regeneration process, a modeled regeneration variable mr which is characteristic of the load burn-off operation during the regeneration process.

The burn-off model AM is configured to ascertain the modeled regeneration variable mr, which is characteristic of the loading burn-off operation during the regeneration process, in a manner dependent on an exhaust-gas volume flow and/or on an exhaust-gas temperature and/or on a loading of the particulate filter PF.

In particular, the measuring device MV is configured to determine, by means of the pressure sensor DS, a loading variable (x1) which is characteristic of the loading of the particulate filter PF before the regeneration process, to ascertain, by means of the burn-off model AM and in a manner dependent on the time duration td of the regeneration process, a loading variable (xm) which is characteristic of the loading of the particulate filter PF after the regeneration process, and to ascertain the modeled regeneration variable mr in a manner dependent on the deviation between the two loading variables x1, xm.

The measuring device MV is configured to ascertain the ash loading of the particulate filter PF in a manner dependent on a deviation between the actual regeneration variable tr and the modeled regeneration variable mr.

Figure 3:
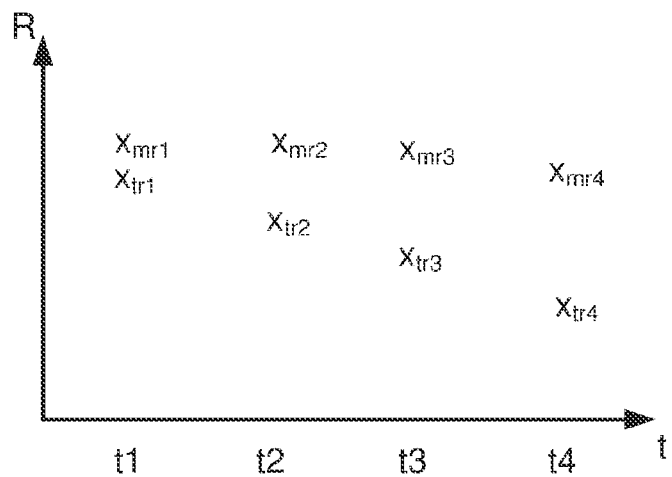
FIG. 3 shows exemplary values for regeneration variables.

FIG. 3 shows exemplary values for regeneration variables. Here, the measuring device MV is configured to ascertain, at at least two points in time t1, t4 in each case one actual regeneration variable tr1, tr4 and one modeled regeneration variable mr1, mr4.

Furthermore, the measuring device may be configured to detect an increase in the ash loading of the particulate filter PF at the second point in time t4, which follows the first point in time t1, if the deviation between the actual regeneration variable tr1, tr4 and the modeled regeneration variable mr1, mr4 is greater at the second point in time t4 than at the first point in time t1.

Alternatively or in addition, the measuring device MV may be configured to ascertain, at at least three points in time t1, t2, t3, t4, in each case one actual regeneration variable tr1, tr2, tr3, tr4 and one modeled regeneration variable mr1, mr2, mr3, mr4, and to detect an increase in the ash loading of the particulate filter PF if a deviation, aggregated over in each case at least two points in time t1, t2; t3, t4, between the actual regeneration variable tr1, tr2; tr3, tr4 and the modeled regeneration variable mr1, mr2; mr3, mr4 is greater at a later point in time t3, t4 than at a point in time t1, t2 which is earlier than the later point in time t3, t4.

Figure 4:
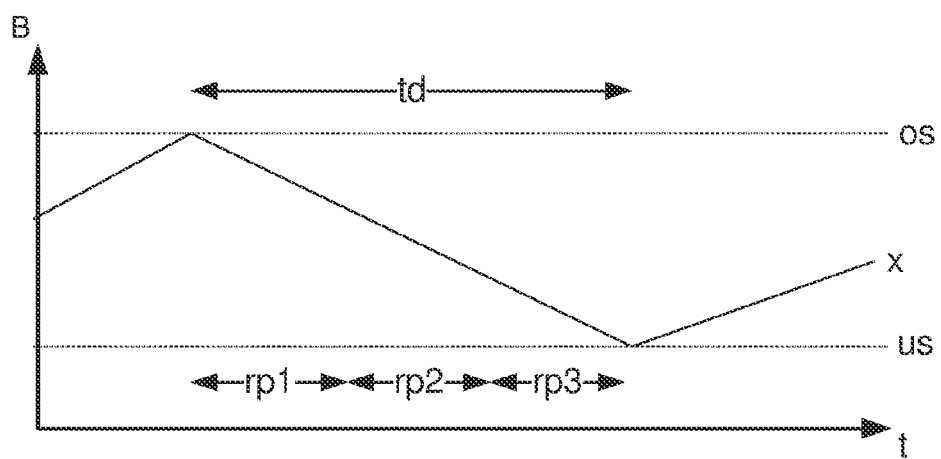
FIG. 4 shows an extrapolated profile of the loading of a particulate filter.

FIG. 4 shows an extrapolated profile of the loading B of a particulate filter. Here, the measuring device MV is configured to determine, by means of the pressure sensor DS, a loading variable x which is characteristic of the loading of the particulate filter PF.

If a first threshold value os for the loading variable is attained or overshot, the measuring device MV starts the regeneration process by means of an engine control unit DME.

If a second threshold value us for the loading variable is attained or undershot, the measuring device MV ends the regeneration process by means of the engine control unit DME.

Furthermore, the measuring device is configured to determine the ash loading of the particulate filter PF in a manner dependent on a time duration td of the regeneration process.

Here, the regeneration process may be composed of at least one regeneration phase rp1, rp2, rp3, and the measuring device MV may be configured to determine the loading variable x by means of the pressure sensor DS after completion of the regeneration phase rp1, rp2, and to start a further regeneration phase rp2, rp3 if the loading variable x does not yet attain or undershoot the second threshold value us.

What is claimed is:

1. An apparatus for determining an ash loading of a particulate filter for an internal combustion engine of a motor vehicle, comprising:
    a measuring device, wherein the measuring device is configured to:
        ascertain, via a pressure sensor fitted in an exhaust system of the internal combustion engine downstream of the particulate filter in an exhaust-gas flow, an actual regeneration variable which is characteristic of a loading burn-off operation during a regeneration process of the particulate filter, wherein after completion of the regeneration process, a predefined minimal soot loading of at least 25% remains in the particulate filter and wherein a loading of the particulate filter with both ash and soot contributes to a pressure measured by the pressure sensor; and
        determine the ash loading of the particulate filter dependent on the actual regeneration variable and on a variable which is characteristic of a time duration of the regeneration process.

2. The apparatus according to claim 1, wherein the measuring device is configured to:
    ascertain, via a burn-off model and dependent on the time duration of the regeneration process, a modeled regeneration variable which is characteristic of the loading burn-off operation during the regeneration process, and
    determine the ash loading of the particulate filter dependent on a deviation between the actual regeneration variable and the modeled regeneration variable.

3. The apparatus according to claim 2, wherein the burn-off model is configured to ascertain the modeled regeneration variable, which is characteristic of the loading burn-off operation during the regeneration process, dependent on an exhaust-gas volume flow and/or on an exhaust-gas temperature and/or on a loading of the particulate filter.

4. The apparatus according to claim 2, wherein the measuring device is configured to:
    determine, via the pressure sensor, a first loading variable which is characteristic of a loading of the particulate filter before the regeneration process;
    ascertain, via the burn-off model and dependent on the time duration of the regeneration process, a second loading variable which is characteristic of a loading of the particulate filter after the regeneration process; and
    ascertain the modeled regeneration variable dependent on a deviation between the first loading variable and the second loading variable.

5. The apparatus according to claim 2, wherein the measuring device is configured to:
    ascertain, at a first point in time and at a second point in time, a respective actual regeneration variable and a respective modeled regeneration variable; and
    detect an increase in the ash loading of the particulate filter at the second point in time, which follows the first point in time, if a respective deviation between the respective actual regeneration variable and the respective modeled regeneration variable is greater at the second point in time than at the first point in time.

6. The apparatus according to claim 2, wherein the measuring device is configured to:
    ascertain, at three points in time, a respective actual regeneration variable and a respective modeled regeneration variable; and
    detect an increase in the ash loading of the particulate filter if a deviation, aggregated over at least two of the three points in time, between the respective actual regeneration variable and the respective modeled regeneration variable is greater at a later point in time than at a point in time which is earlier than the later point in time.

7. The apparatus according to claim 1, wherein the measuring device is configured to:
    determine, via the pressure sensor, a first loading variable which is characteristic of a loading of the particulate filter before the regeneration process;
    determine, via the pressure sensor, a second loading variable which is characteristic of a loading of the particulate filter after the regeneration process; and
    ascertain the actual regeneration variable dependent on a deviation between the first loading variable and the second loading variable.

8. The apparatus according to claim 1, wherein the measuring device is configured to:
    determine, via the pressure sensor, a loading variable which is characteristic of a loading of the particulate filter;

start the regeneration process by an engine control unit if a first threshold value for the loading variable is attained or overshot;

end the regeneration process by the engine control unit if a second threshold value for the loading variable is attained or undershot; and determine the ash loading of the particulate filter dependent on the time duration of the regeneration process.

9. The apparatus according to claim 8, wherein the regeneration process is comprised of at least one regeneration phase and wherein the measuring device is configured to:

determine the loading variable via the pressure sensor after completion of the at least one regeneration phase; and start a second regeneration phase if the loading variable does not attain or undershoots the second threshold value.

10. A measuring method for determining an ash loading of a particulate filter for an internal combustion engine of a motor vehicle, comprising the steps of:

performing a regeneration process of the particulate filter such that, after completion of the regeneration process, a predefined minimal soot loading of at least 25% remains in the particulate filter;

ascertaining by a measuring device via a pressure sensor fitted in an exhaust system of the internal combustion engine downstream of the particulate filter an actual regeneration variable which is characteristic of a loading burn-off operation during the regeneration process of the particulate filter, wherein a loading of the particulate filter with both ash and soot contributes to a pressure measured by the pressure sensor; and determining by the measuring device the ash loading of the particulate filter dependent on the actual regeneration variable and on a variable which is characteristic of a time duration of the regeneration process.

* * * * *